US012228062B1

(12) United States Patent
Guzman et al.

(10) Patent No.: US 12,228,062 B1
(45) Date of Patent: Feb. 18, 2025

(54) DIESEL EMISSIONS CONTROL SYSTEM

(71) Applicant: Generac Power Systems, Inc., Waukesha, WI (US)

(72) Inventors: Enrique Guzman, Caledonia, WI (US); Joseph Morgan, Cudahy, WI (US); Antonio Carini, West Allis, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 18/592,171

(22) Filed: Feb. 29, 2024

Related U.S. Application Data

(60) Provisional application No. 63/611,610, filed on Dec. 18, 2023.

(51) Int. Cl.
  *F01N 3/20* (2006.01)
(52) U.S. Cl.
  CPC ...... *F01N 3/2066* (2013.01); *F01N 2610/105* (2013.01); *F01N 2610/1406* (2013.01); *F01N 2610/1433* (2013.01)
(58) Field of Classification Search
  CPC ....... F01N 2610/142; F01N 2610/1406; F01N 2610/02; F01N 2900/1822; F01N 2900/1814; F01N 2900/1812; F01N 2900/1811; F01N 2610/1413; F01N 13/002; F01N 3/208
  See application file for complete search history.

(56) References Cited

U.S. PATENT DOCUMENTS

| | | | | |
|---|---|---|---|---|
| 10,794,257 B2* | 10/2020 | Fell | | F01N 13/002 |
| 2010/0206415 A1* | 8/2010 | Ellis | | F16L 53/37 |
| | | | | 219/535 |
| 2015/0300228 A1* | 10/2015 | Gong | | F01N 3/2066 |
| | | | | 141/1 |
| 2020/0032694 A1* | 1/2020 | Fell | | F01N 3/208 |
| 2023/0287823 A1* | 9/2023 | Singh | | F01N 11/00 |

* cited by examiner

*Primary Examiner* — Anthony Ayala Delgado
(74) *Attorney, Agent, or Firm* — Merchant & Gould P.C.

(57) ABSTRACT

A diesel emissions control system comprising a first DEF tank and a second DEF tank. A pump for pumping fluid from one or more of the first DEF tank and the second DEF tank. A connection line fluidly connecting the first DEF tank and the second DEF tank. A heating system preventing freezing of the DEF in the diesel emissions control system.

12 Claims, 14 Drawing Sheets

DIESEL EMISSIONS CONTROL SYSTEM

CROSS-REFERENCE TO RELATED APPLICATION(S)

This application claims priority to U.S. Provisional Application No. 63/611,610, filed Dec. 18, 2023, the disclosure of which is hereby incorporated by reference in its entirety.

BACKGROUND

Diesel Exhaust Fluid (DEF) is a critical component in meeting emissions standards for diesel engines and is required by regulations in many countries. The use of DEF helps reduce harmful emissions and improve air quality, while also improving the performance and longevity of diesel engines.

DEF is a solution of purified water and urea that is used to reduce the emissions of oxides of nitrogen (NOx) from diesel engines. When DEF is injected into the exhaust stream of a diesel engine, it reacts with the NOx in the exhaust gases and converts it into harmless nitrogen gas and water vapor.

The use of DEF is required by most diesel engine manufacturers in order to comply with emissions regulations, particularly in the United States and Europe. The most widely recognized emissions regulations are the Environmental Protection Agency's (EPA) Tier 4 Final and European Union's (EU) Stage V standards.

Under these regulations, all new diesel engines must meet strict emissions standards, which require the use of DEF injection technology. The amount of DEF used depends on the engine's size and emissions output, but typically ranges from 2-5% of diesel fuel consumption.

The EPA and EU regulations also specify that DEF must meet certain quality standards. DEF must be a 32.5% urea solution and must be free from impurities such as dust, metal particles, and other contaminants. DEF is typically stored in a separate tank on the vehicle or equipment and must be replenished periodically based on usage. Under the EPA regulations, the DEF tank cannot be refilled more frequently than the fuel tank.

SUMMARY

In general terms, this disclosure is directed to a diesel emissions control system. In some examples, the concepts described herein with reference to the diesel emissions control system can be implemented to increase the onboard DEF carrying capacity of a DEF reservoir of a unit on which the diesel emissions control system is included. Furthermore, depending on where the diesel emissions control system is used, environmental conditions may cause DEF contained a diesel emissions control system to freeze. The concepts described herein with reference to the diesel emissions control system can be implemented to prevent freezing of the DEF within a DEF reservoir of a diesel emissions control system. In some examples, the concepts described herein can further be implemented to thaw frozen DEF within a DEF reservoir.

In some embodiments, and by non-limiting example, a generator comprises a diesel emissions control system. The diesel emissions control system comprises an onboard reservoir. The onboard reservoir comprises a first DEF tank and a second DEF tank. The first DEF tank is fluidly connected to the second DEF tank by a connection line. The diesel emissions control system further comprises an intake fluidly connected to the first DEF tank by a first tank intake line and the second DEF tank by a second tank intake line. The diesel emissions control system further comprises a pump fluidly connected to at least one of the first DEF tank and the second DEF tank. The diesel emissions control system further comprises a heating system comprising an engine coolant supply line, an engine coolant return line, a first tank heating assembly, and a second tank heating assembly.

In other embodiments, and by non-limiting example, a diesel emissions control system comprises, a reservoir comprising a first DEF tank and a second DEF tank. The first DEF tank and the second DEF tank are fluidly connected. The diesel emissions control system further comprises an intake connected to each of the first DEF tank and the second DEF tank, the intake comprises a single fill port. The diesel emissions control system further comprises a pump fluidly connected to at least one of the first DEF tank and the second DEF tank. The pump is configured to pump DEF from the at least one of the first DEF tank and the second DEF tank. The diesel emissions control system further comprises a heating system comprising a first tank heating coil assembly and a second tank heating coil assembly.

In other embodiments, and by non-limiting example, a DEF storage system comprises a reservoir comprising a first DEF tank and a second DEF tank. The first DEF tank is fluidly connected to the second DEF tank by a connection line. The connection line provides for equalization of a level of DEF in the first DEF tank and the second DEF tank. The DEF storage system comprises an intake connected to at least one of the first DEF tank. The DEF storage system further comprises a pump connected to at least one of the first DEF tank and the second DEF tank. The pump is configured to pump DEF from both the first DEF tank and the second DEF tank.

DETAILED DESCRIPTION

Figure 1:
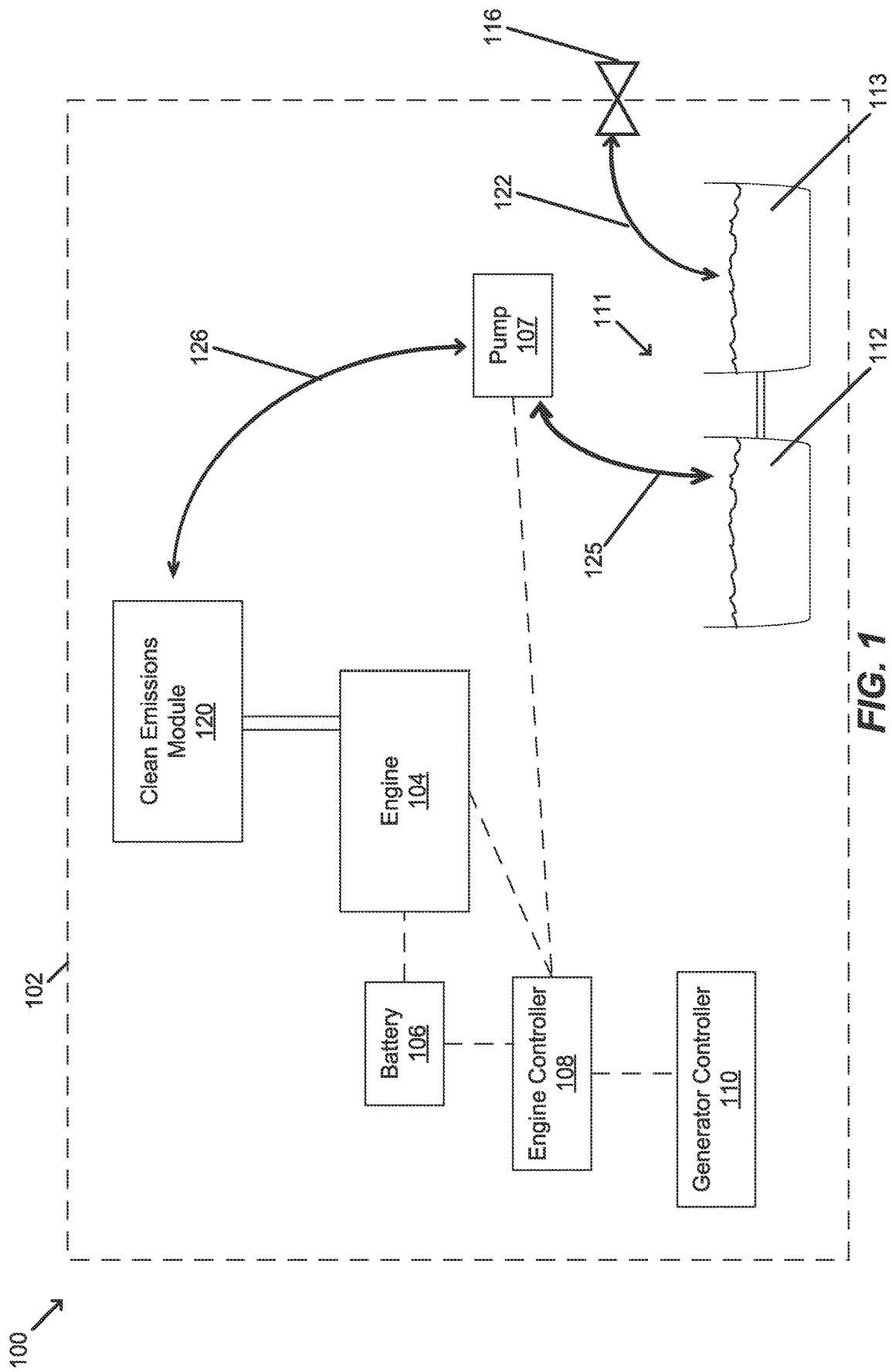
FIG. 1 is a schematic view of an example diesel emissions control system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic view of an example diesel emissions control system 100. As shown in FIG. 1, the diesel emissions control system 100 includes an enclosure 102, an engine 104, a battery 106, a pump 107, an engine controller 108, a generator controller 110, an onboard DEF reservoir 111, an enclosure pass through 116, clean emissions module 120, a DEF fill line 122, a pump intake line 125, and an engine DEF supply line 126. While FIG. 1 illustrates the onboard DEF reservoir 111 as comprising two DEF tanks 112, 113, in some examples, the onboard DEF reservoir 111 comprises more than two DEF tanks.

As shown in the example of FIG. 1, the enclosure 102 houses the engine 104, battery 106, engine controller 108, generator controller 110, clean emissions module 120, DEF reservoir 111, DEF fill line 122, pump intake line 125, and the engine DEF supply line 126. In the example of FIG. 1, the enclosure pass through 116 is formed within a wall of the enclosure 102.

The engine 104 comprises a diesel engine. In some examples, the clean emissions module 120 comprises an after treatment system. In some examples, the clean emissions module 120 comprises a DEF exhaust module which is configured to deliver DEF into an exhaust system of the engine 104.

The battery 106 is connected to the engine (specifically the engine exhaust module) by an electrical connection. In some examples, the battery 106 is a single 24 VDC battery. In other examples, the battery comprises multiple 24 VDC batteries. In some examples, the battery 106 includes one or more 12 VDC batteries, such as, for example two 12 VDC batteries connected in series for a total of 24 VDC.

The engine controller 108 is connected to the battery 106 by an electrical connection. The engine controller 108 reads values from sensors, interprets the data from the sensors, and communicates signals to other parts of the diesel emissions control system 100. In some examples, the engine controller 108 is electrically connected to and sends and/or receives signals to/from the generator controller 110, the engine 104, and the pump 107. In the example illustrated in FIG. 1, the engine controller 108 communicates signals to a pump 107, which pumps DEF from the DEF reservoir 111 to the clean emissions module 120. In some examples, both the engine controller 108 and the generator controller 110 are provided. In other examples, the generator controller 110 is not included in the diesel emissions control system 100.

In some examples, the pump 107 draws DEF from the reservoir 111 via the pump intake line 125. In some examples, the pump 107 delivers DEF to the clean emissions module 120 via the engine DEF supply line 126.

Figure 2:
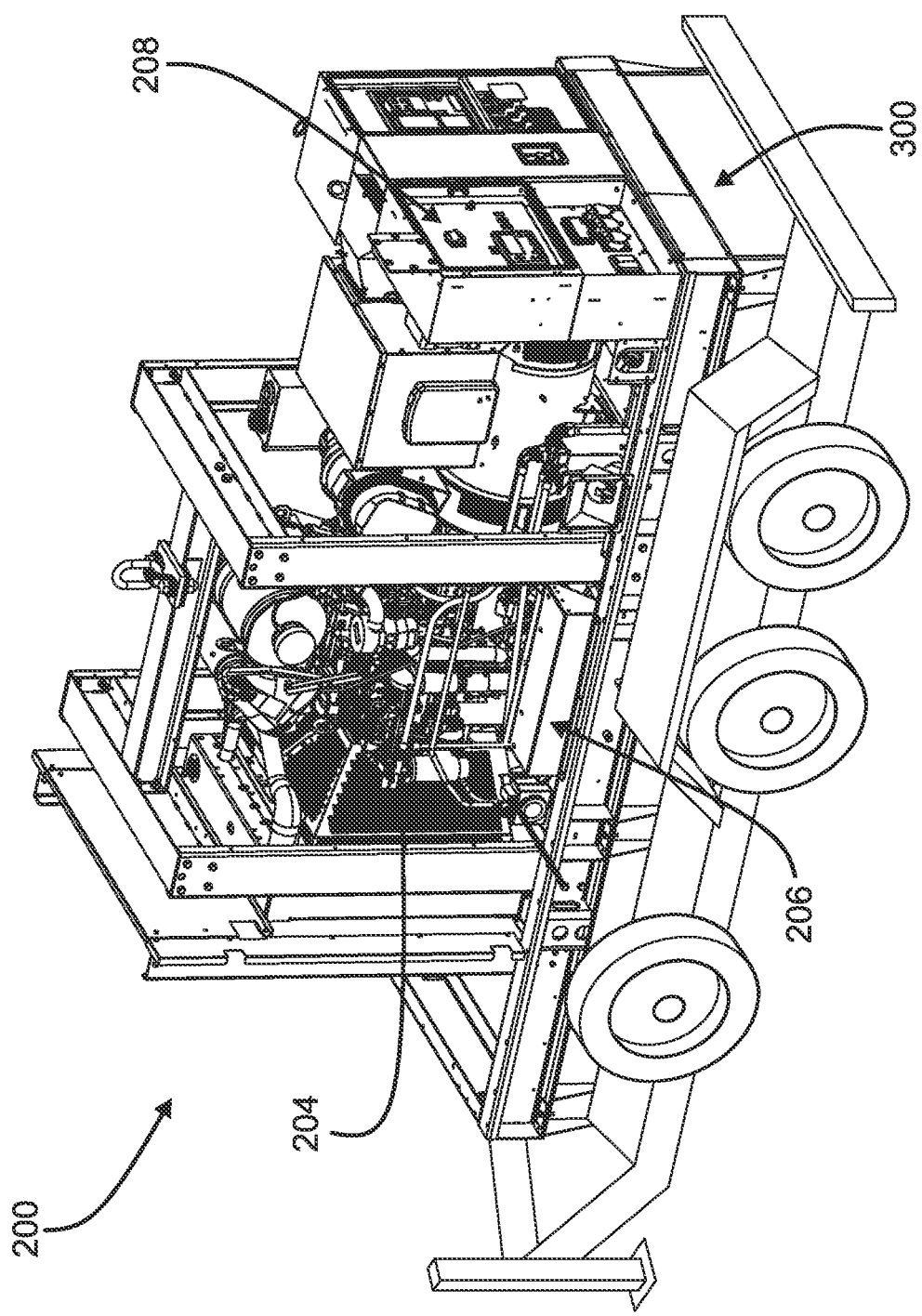
FIG. 2 is a perspective view of an example mobile diesel generator.

FIG. 2 is an example mobile diesel generator 200 in which a diesel emissions control system, such as, for example, the diesel emissions control system 100 of FIG. 1, is included. In some examples, the diesel emissions control system 100 of FIG. 1 may be installed in other devices, such as, for example, on-road vehicles, off-road vehicles, agricultural and construction vehicles, commercial and industrial equipment, or marine vessels. In the example of FIG. 2, the mobile diesel generator 200 includes an enclosure (not shown), an engine 204, a battery 206, a control portion 208, and a DEF storage system 300.

In some examples, the engine 204 is configured substantially similarly to the engine 104, and the battery 206 is configured substantially similarly to the battery 106. In some examples, the control portion 208 includes an engine controller and generator controller, which are configured substantially similarly to the engine controller 108 and the generator controller 110 of FIG. 1.

Figure 3:
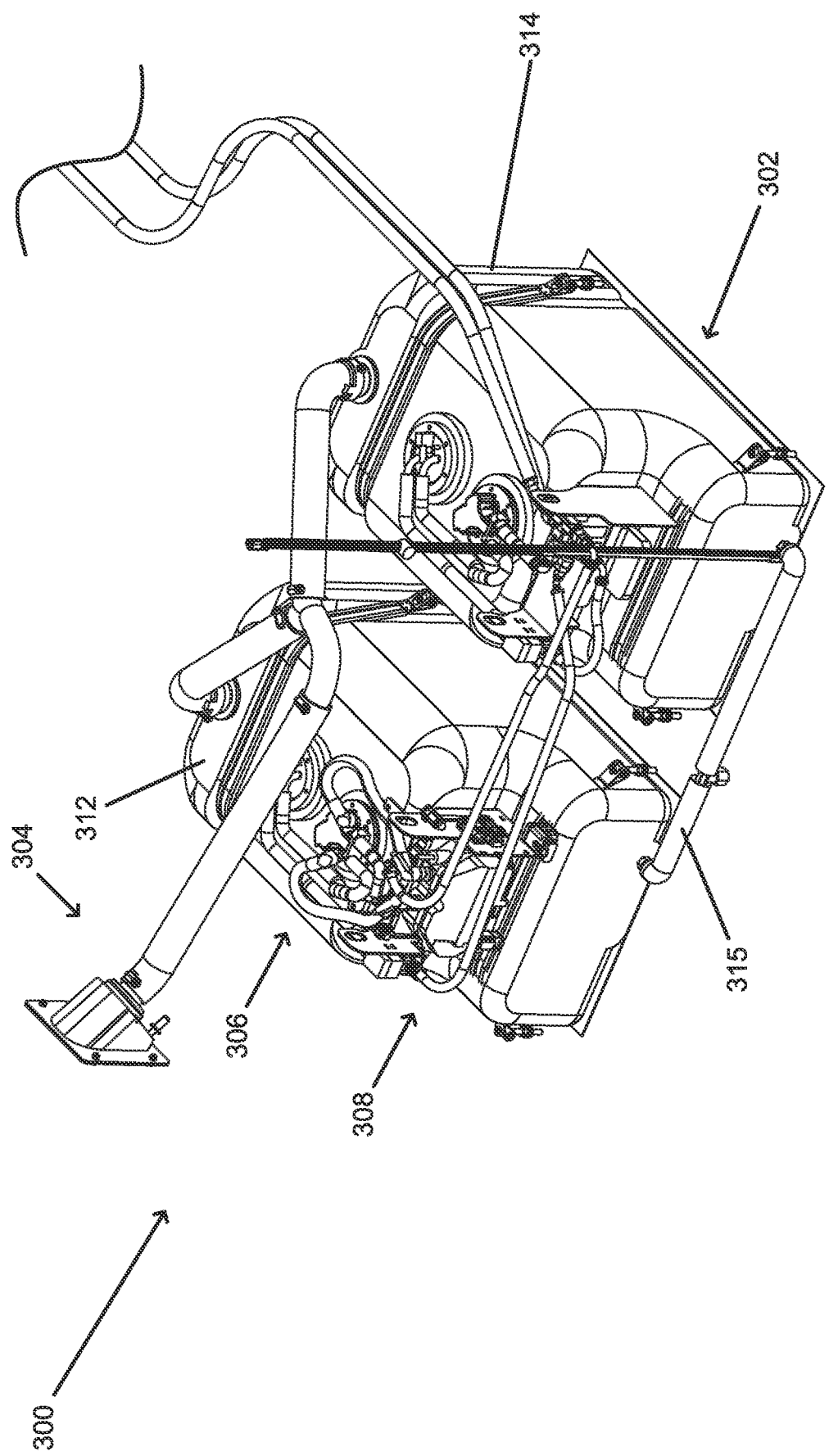
FIG. 3 is a perspective view of an example DEF storage system.
Figure 4:
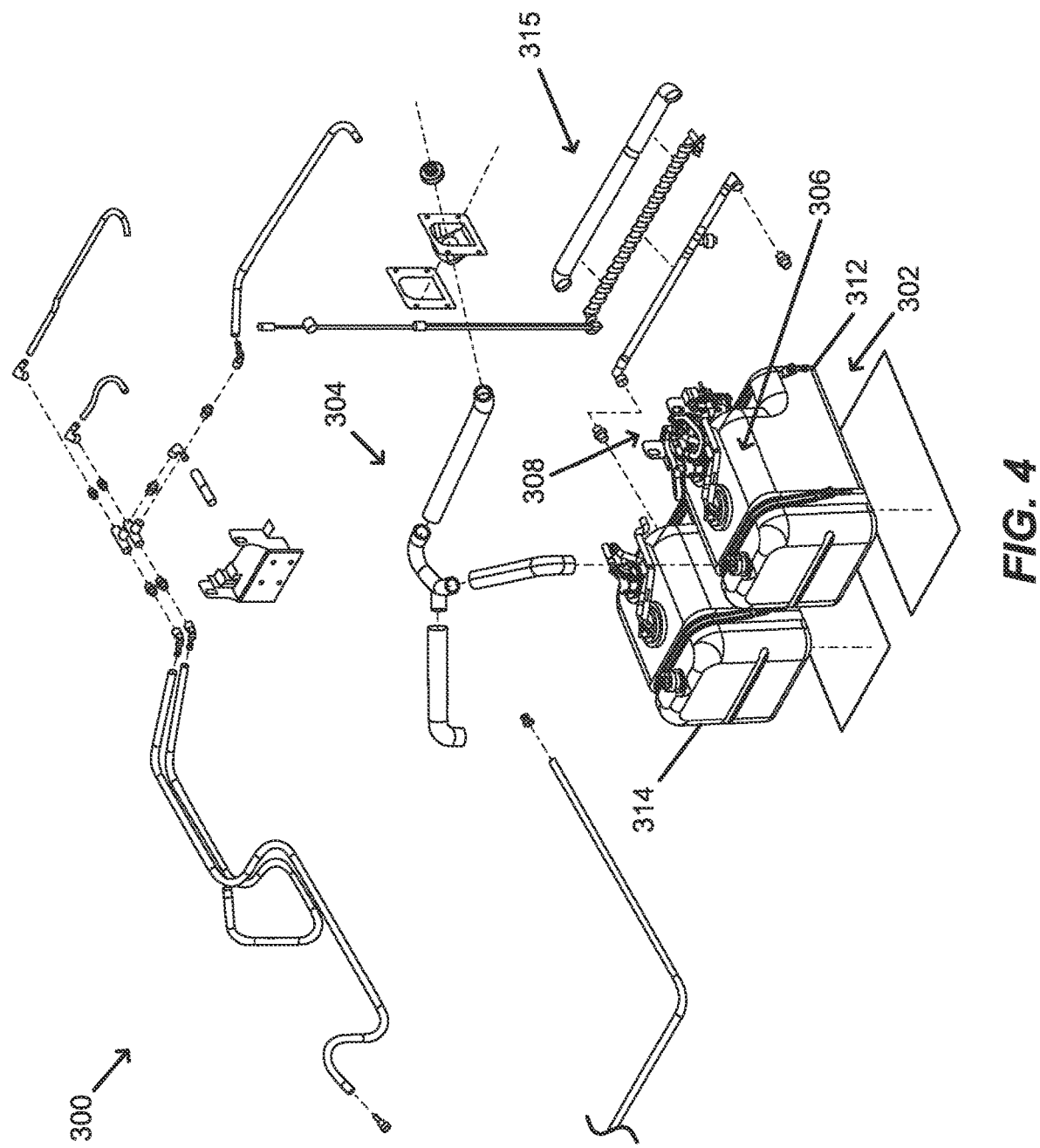
FIG. 4 is an exploded perspective view of the DEF storage system of FIG. 3.

FIG. 3 is a perspective view of an example DEF storage system 300. FIG. 4 is an exploded view of the DEF storage system 300 of FIG. 3. In some examples, the DEF storage system 300 is used within the mobile diesel generator 200. The DEF storage system 300 includes a reservoir portion 302, an intake 304, a heating system 306, and a DEF pumping system 308. In some examples, the intake 304 is configured to permit filling of the reservoir portion 302 with DEF. The heating system 306 is arranged in and around the reservoir portion 302 and is configured to maintain the reservoir portion 302 at an appropriate temperature for DEF storage within the reservoir portion 302. The DEF pumping system 308 pumps DEF from the reservoir portion 302 to a clean emissions module, such as the clean emissions module 120 described with reference to FIG. 1, which delivers the DEF to the engine 204 of the mobile diesel generator 200.

In some examples, the reservoir portion 302 includes a first tank 312, a second tank 314, and a connection line 315. In some examples, the first tank 312 and the second tank 314 are identical. In some examples, the first tank 312 and the second tank 314 are mounted side by side when arranged within the DEF storage system 300. In some examples, the connection line 315 is fluidly connected to both the first tank 312 and the second tank 314.

Figure 5:
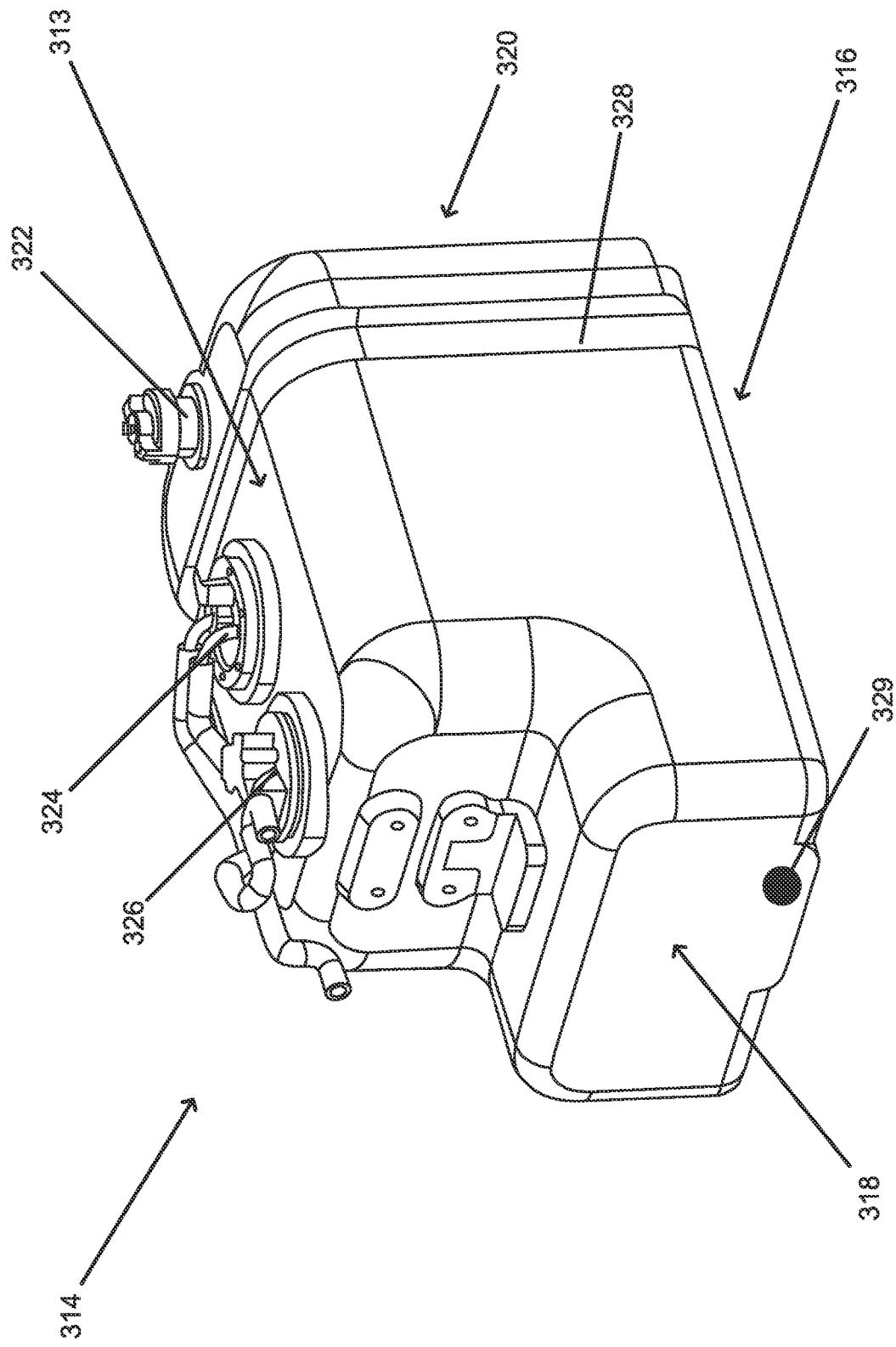
FIG. 5 is a perspective view of an example first tank of the DEF storage system of FIG. 3.

FIG. 5 is a perspective view of an example tank of the DEF storage system 300, such as, for example, the example second tank 314. The second tank 314 includes a top side 313, a bottom side 316, a front side 318, and a rear side 320. In some examples, the second tank also includes a DEF intake port 322, a first auxiliary port 324, a second auxiliary port 326, a mounting groove 328, and a DEF equalization port 329.

In some examples, the DEF intake port 322 is located on the top side of the tank 314 and provides a sealable access point through which DEF can be flowed into the tank 314. In some examples, the DEF intake port is connected to the intake 304 of FIG. 3 such that DEF can flow through the intake 304 and into the DEF intake port 322.

In some examples, the first auxiliary port 324 is located on the top side 313 of the tank 314. In some examples, the second auxiliary port 326 is also located on the top side 313 of the tank 314. In some examples, the tank 314 includes greater or fewer thermal ports. In some examples, the thermal ports provide access points for the heating system 306 to be inserted into the tank 314 to control the temperature of the DEF located therein.

The mounting groove 328 is located on the top side 313 of the tank 314, and in some examples, such as the example of FIG. 5, also extends along side surfaces of the DEF tank. In some examples, the mounting groove 328 is a recess and/or a channel in the surface of the tank 314 in which a retaining band can be arranged to secure the tank 314 to a surface within in the mobile diesel generator, such as, for example, the mobile diesel generator 200 of FIG. 2.

The DEF equalization port 329 extends through a surface of the tank 314 to permit access to the interior of the tank 314. In some examples, the DEF equalization port 329 is arranged on the front side 318 of the tank 314 at a portion of the front side 318 that is adjacent the bottom side 316 of the tank 314.

Figure 6:
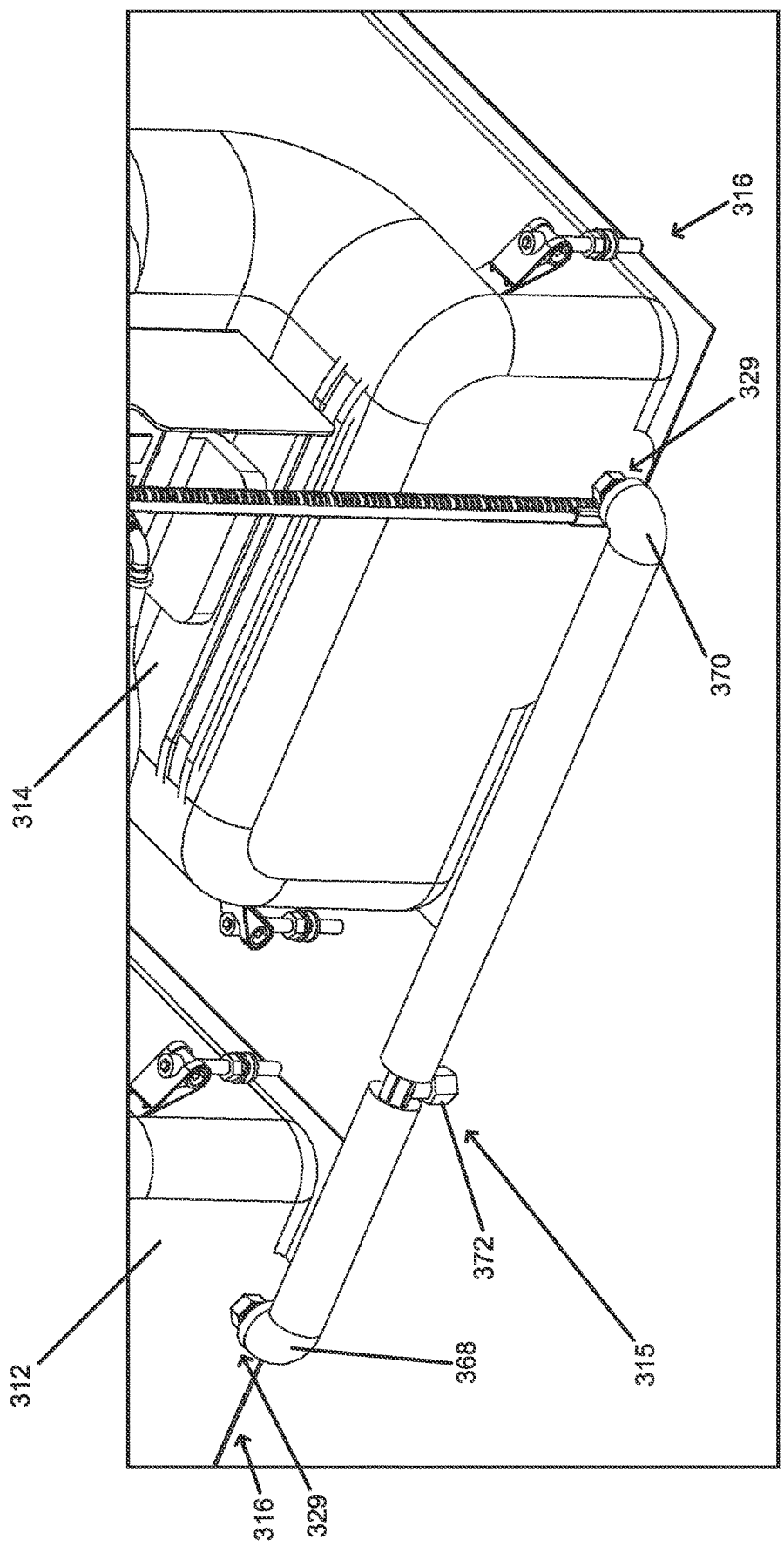
FIG. 6 is a perspective view of an example connection line of the DEF storage system of FIG. 3.

FIG. 6 is a perspective view of the connection line 315 and portions of the first tank 312 and second tank 314. The connection line 315 includes a first end 368, a second end 370, and a drain 372. The connection line 315 is generally configured to permit the flow of DEF between the first tank 312 and the second tank 314. In some examples, the connection line 315 allows for the equalization of DEF fill levels in the first tank 312 and the second tank 314.

The first end 368 of the connection line 315 is connected to the DEF equalization port 329 of the first tank 312 and the second end 370 of the connection line 315 is connected to the DEF equalization port 329 of the second tank 314. In some examples, the connection line 315 is arranged substantially horizontally with respect to the first tank 312 and the second tank 314 and extends between the first tank 312 and the second tank 314.

In some examples, the drain 372 is located along the length of the connection line 315 between the first end 368 and the second end 370 of the connection line 315. In some examples, the drain allows for DEF to be drained from the first tank 312 and the second tank 314 when components of the DEF storage system 300 need to be repaired or replaced. In some examples, the drain 372 is selectively openable such that when the DEF storage system 300 is in operation, DEF may flow through the connection line 315 while the drain 372 is sealed.

In some examples, as shown in FIG. 6, when arranged within the DEF storage system 300, the first tank 312 and the second tank 314 are arranged at an equal height relative to each other. In such examples, the bottom side 316 of the first tank 312 and the bottom side 316 of the second tank 314 are substantially coplanar.

Figure 7:
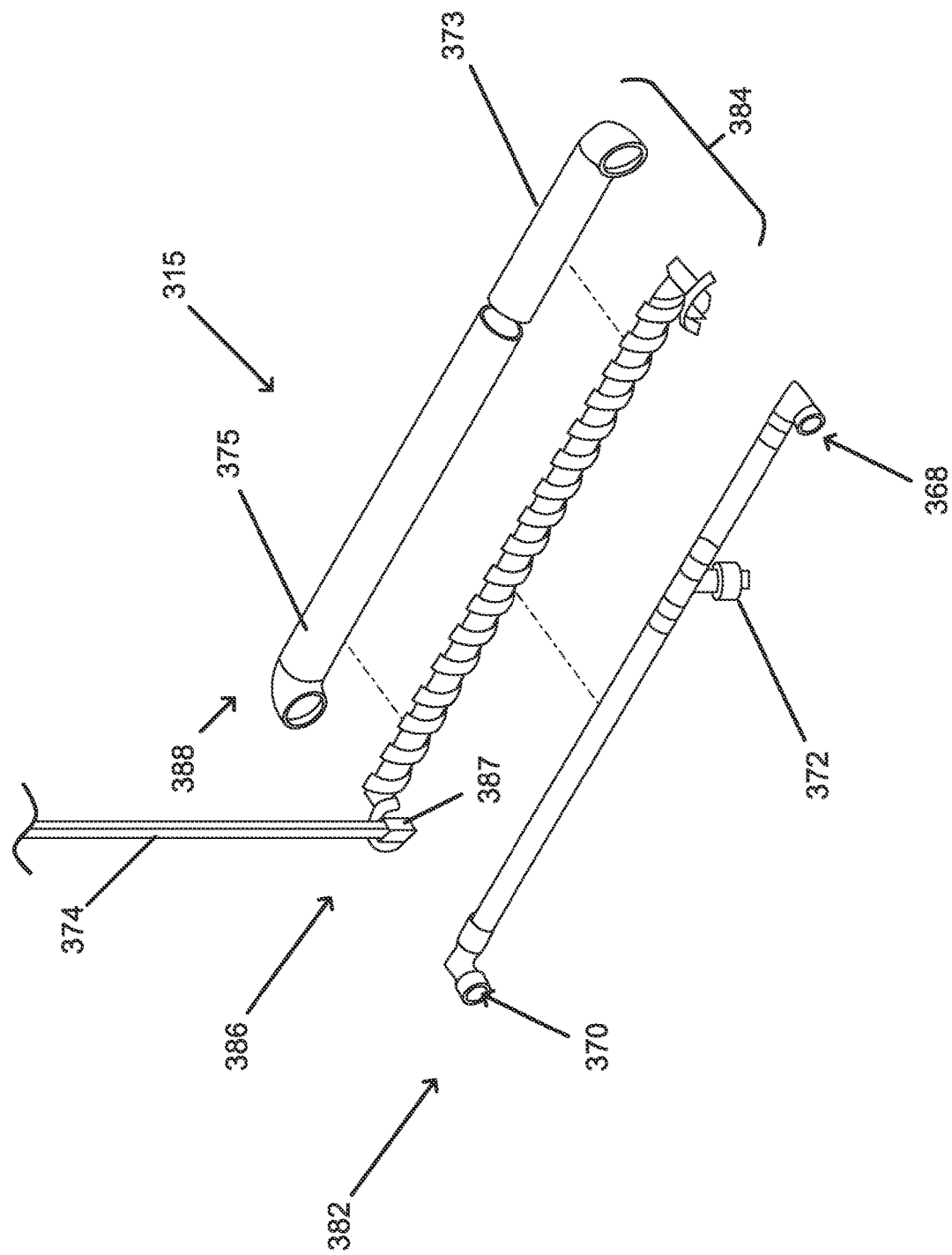
FIG. 7 is an exploded view of the connection line of FIG. 3.

FIG. 7 is an exploded view of the connection line 315. In some examples, as shown in FIG. 7, the connection line 315 includes a conduit portion 382 and a heating portion 384. In some examples, the conduit portion 382 comprises a hose material, such as, for example, rubber, ethylene propylene diene monomer rubber, or silicone. In other examples, the conduit portion 382 comprises a pipe material, such as, for example, aluminum, steel, or PCV. The conduit portion 382 contacts the DEF when the DEF flows with in the connection line 315.

In some examples such as in the example of FIG. 7, the heating portion 384 comprises a heating coil 386 and an insulating portion 388. In some examples, the heating portion 384 surrounds the conduit portion 382 of the connection line 315. In some examples, the heating coil 386 surrounds and contacts the conduit portion 382 and the insulating portion 388 surrounds and contacts the heating coil 386. In some examples, the heating portion 384 is arranged along the length of the conduit portion 382 and extends between the first end 368 and the second end 370 of the connection line 315. In some examples, the heating portion 384 functions to heat the conduit portion 382 such that DEF within the connection line 315 remains at a temperature above a freezing point of DEF, such as, for example, above 12 degrees Fahrenheit. In some examples, the heating portion 384 functions to heat the conduit portion 382 to melt DEF that has frozen within the connection line 315. In some examples, the heating portion 384 extends along a portion of the length of the conduit portion 382. In other examples, the heating portion 384 extends along the entire length of the conduit portion 382.

In some examples, the heating coil 386 comprises, for example, an electric heat trace cable or a silicone rubber heating tape. In some examples, the heating coil 386 is a 30 W 24 VDC spiral wrap heater. In some examples, the heating coil 386 is wrapped around the circumference of the conduit portion 382 along the length of the conduit portion 382.

In some examples, the heating coil 386 further comprises an electrical harness 374, which delivers power to the heating coil 386 from an electrical power source and controls the thermal output of the heating coil 386. In some examples, the electrical harness 374 is provided with a constant power supply from the electrical power source. In some examples, the electrical harness 374 further includes a thermal switch 387, such as, for example, a thermostat thermal switch. In some examples, the thermal switch 387 monitors the temperature of the environment in which the DEF storage system 300 is located. In other examples, the thermal switch 387 monitors the temperature of the DEF in the connection line 315. In some examples, the thermal switch 387 is configured to be in a closed position if the monitored temperature is lower than a lower threshold value and an open position if the monitored temperature is higher than an upper threshold value. In some examples, the lower threshold value is equal to the upper threshold value. In some examples, when placed into the closed position, the electrical harness 374 delivers power from the electrical power source to the heating coil 386, which causes the heating coil 386 to generate heat and heat the connection line 215.

In some examples, the lower threshold value is about 40 degrees Fahrenheit+/−about 9 degrees Fahrenheit (such as 40 degrees Fahrenheit+/−9 degrees Fahrenheit). In some examples, the upper threshold value is about 60 degrees Fahrenheit+/−about 5 degrees Fahrenheit (such as 60 degrees Fahrenheit+/−5 degrees Fahrenheit). In some examples each of the upper threshold and the lower threshold values are greater than about 12 degrees Fahrenheit and less than about 86 degrees Fahrenheit.

In other examples, the electrical harness 374 is connected to a controller. In some examples, the controller transmits electrical signals through a fused harness. In other examples, the controller transmits electrical signals to a relay that controls the delivery of power from the electrical harness 374 to the heating coil 386. Such a connection and control process is described in greater detail with reference to the example of FIG. 14.

In some examples, such as the example of FIG. 7, the insulating portion 388 is formed from several separate sections of insulating material. In such examples, the insulating portion 388 includes a first portion 373 that extends between the first end 368 of the connection line 315 and the drain 372, and a second portion 375 that extends between the second end 370 and the drain 372. In some examples, the insulating portion 388 is arranged such that it completely surrounds the heating coil 386 when the heating coil 386 is wrapped around the conduit portion 382. In some examples, the insulating portion 388 comprises, for example, polyurethane foam, polyethylene foam, polystyrene foam, fiberglass pipe insulation, phenolic foam, silicone foam, aerogel insulation, mineral wool insulation, ceramic fiber insulation, or rubber foam insulation.

In some examples, heating of the connection line 315 is beneficial because it prevents the DEF from freezing, thereby allowing the DEF to flow freely between the first tank 312 and the second tank 314. In some examples, using the heated connection line 315, DEF is permitted to flow freely even when the DEF storage system 300 is used in an environment below the freezing point of the DEF. In some examples, the free flow of DEF between the first tank 312 and the second tank 314 allows for the DEF levels in the first tank 312 and the second tank 314 to equalize. Thus, the collective volume of DEF in both of the first tank 312 and the second tank 314 can be drawn from a single one of the first tank 312 and the second tank 314.

While the heating portion 384 is described above as comprising a heating cable, in some alternative examples, the heating portion 384 comprises, for example, an insulated heating jacket, a steam tracing system, an insulated pipe jacket with heater, a pipe heating blanket, a heat shrinkable sleeve, one or more infrared heating lamps, or a hot water or glycerol circulation system (such as a coolant line). In some examples, the heating portion 384 of the connection line 315 is included as a component of the heating system 306.

Figure 8:
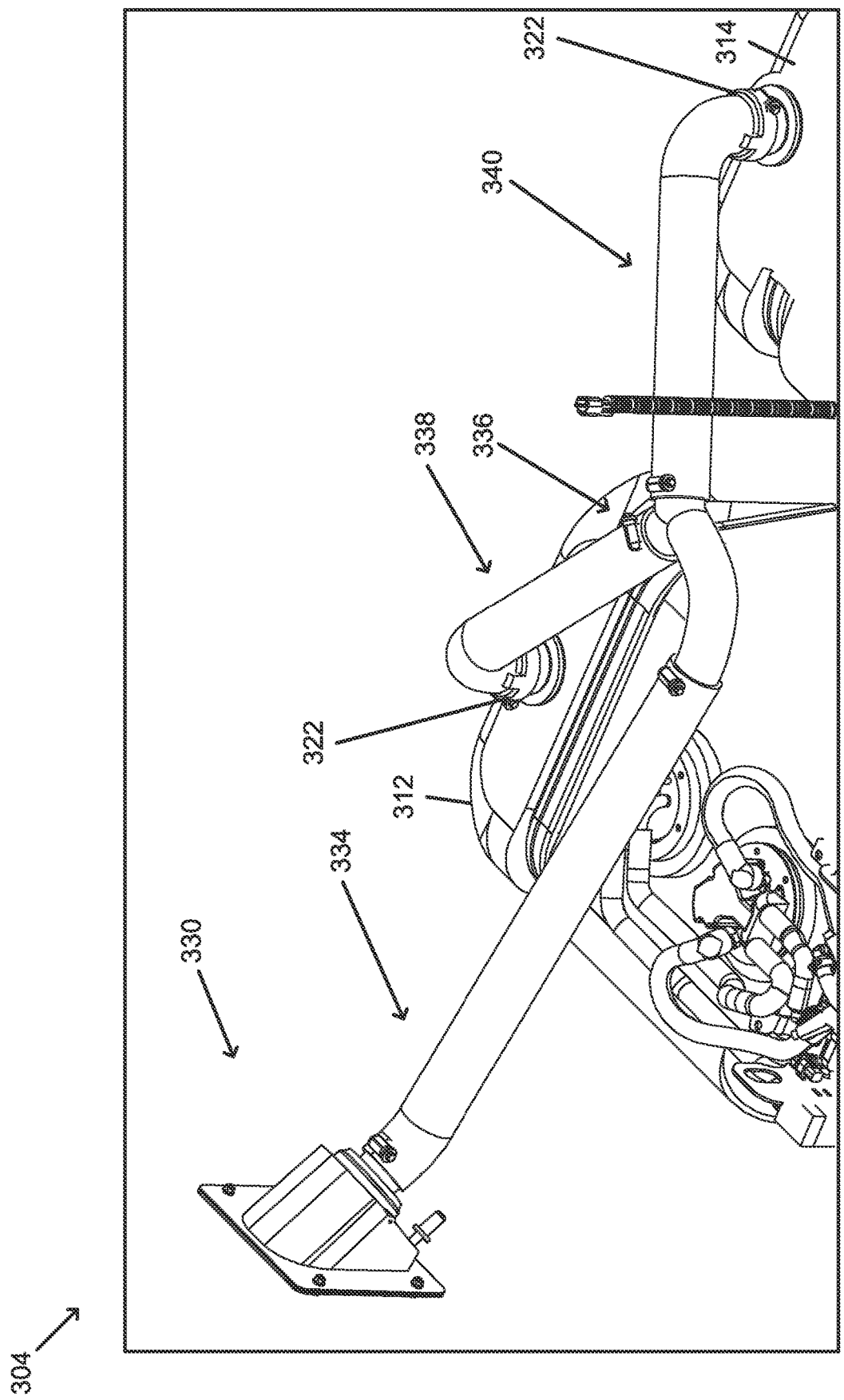
FIG. 8 is a perspective view of an example intake of the DEF storage system of FIG. 3.

FIG. 8 is a perspective view of the intake 304 of the DEF storage system 300. In the example of FIG. 8, the intake 304 includes an enclosure mounting portion 330, a primary intake line 334, a wye connector 336, a first tank intake line 338, and a second tank intake line 340. In some examples, enclosure mounting portion 330, primary intake line 334, wye connector 336, first tank intake line 338, and second tank intake line 340 are all fluidly connected to each other. In some examples, the enclosure mounting portion 330 is connected to the primary intake line 334. The primary intake line 334 is connected to the wye connector 336. The wye connector 336 is connected to the first tank intake line 338 and the second tank intake line 340. The first tank intake line 338 is connected to the first tank 312. And the second tank intake line 340 is connected to the second tank 314.

In some examples, the intake 304 is configured to receive DEF from outside of the mobile diesel generator and deliver the DEF to the first tank 312 and the second tank 314. In some examples, the intake 304 delivers a substantially equal amount of DEF to each of the first tank 312 and the second tank 314. In some such examples, the intake 304 delivers a slightly greater amount of DEF to the first tank 312 and the second tank 314. In some examples, DEF flows from the enclosure mounting portion, through the primary intake line 334, at which point it is diverted by the wye connector 336 into the first tank intake line 338 and the second tank intake line 340, through which it flows into the first tank 312 and the second tank 314, respectively. In some examples, the enclosure mounting portion 330 is connected to the primary intake line 334 at point that is above the point at which the primary intake line 334 is connected to the wye connector 336. This arrangement causes DEF to flow from the enclosure mounting portion 330 towards the wye connector 336. Likewise, in some examples, each of the first tank intake line 338 and the second tank intake line 340 are connected to the wye connector 336 at a point that is above the points at which the first tank intake line 338 and the second tank intake line 340 are connected to the first tank 312 and the second tank 314, respectively, such that DEF flows from the wye connector 336 into the first tank 312 and the second tank 314.

Figure 9:
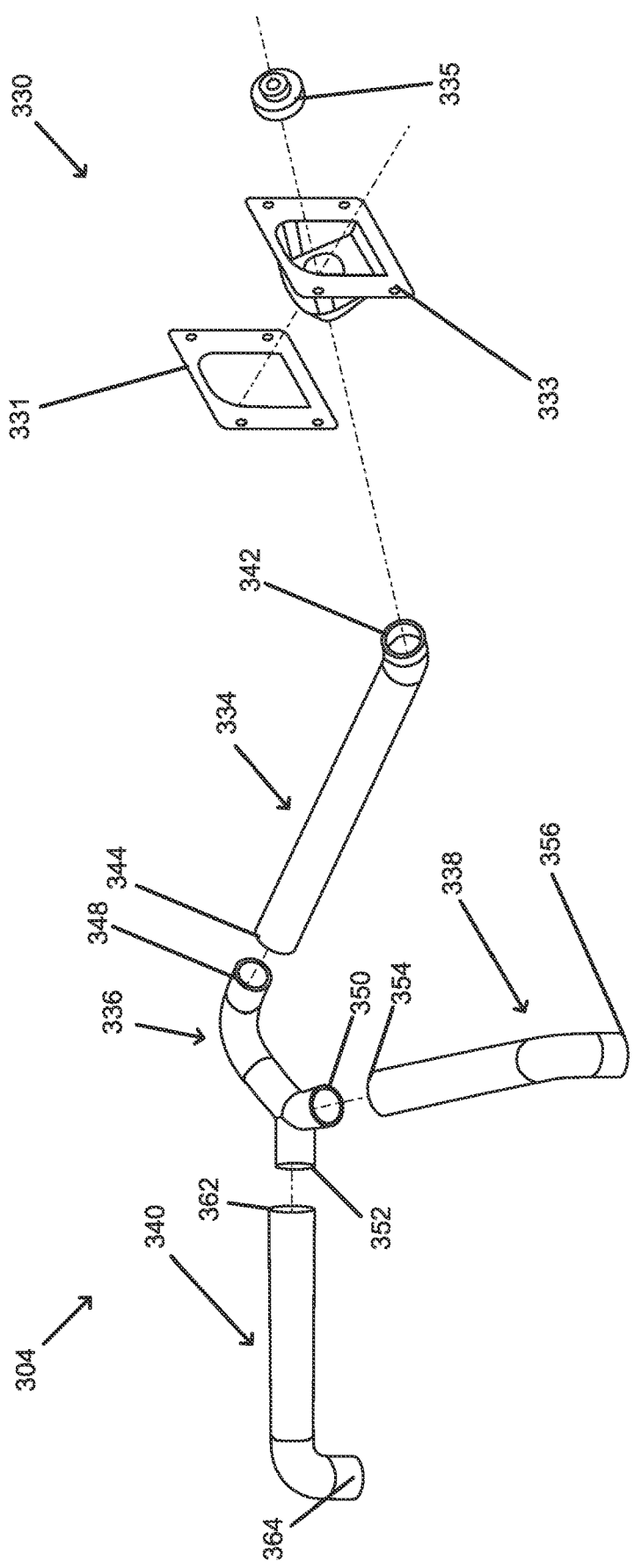
FIG. 9 is an exploded view of the intake of FIG. 8.

FIG. 9 is an exploded view of the intake 304 of the diesel emissions system of FIG. 8. As noted above, the intake 304 includes an enclosure mounting portion 330, a primary intake line 334, a wye connector 336, a first tank intake line 338, and a second tank intake line 340. In some examples, the intake 304 comprises a single fill port through which DEF can be simultaneously added to the first tank 312 and the second tank 314.

The enclosure mounting portion 330 connects the intake 304 to an enclosure of a mobile diesel generator and comprises an access point through which DEF can be added to the first tank 312 and the second tank 314 of the DEF storage system 300. In some examples, the enclosure mounting portion 330 includes a mounting gasket 331, a mounting flange 333, and a cap 335. In some examples, the mounting gasket 331 is secured to a sidewall of a mobile diesel generator enclosure. The mounting flange 333 is secured to the sidewall of the mobile diesel generator and extends into the enclosure through an opening in the sidewall and the mounting gasket 331, at which point it is connected to an end of the primary intake line 334. In some examples, the mounting flange 333 is secured over the mounting gasket 331. In some examples, the mounting flange 333 and the mounting gasket 331 are connected to the enclosure sidewall using fasteners that extend through holes arranged in each of the mounting gasket 331 and the mounting flange 333. In some examples, the mounting flange 333 is connected to the primary intake line 334 using hose clamps, threads, glue, fasteners, or other connections that permit fluid flow from the enclosure mounting portion 330 into the primary intake line 334. The cap 335 is releasably connected to the mounting flange 333 and is configured to seal the intake 304 from an environment outside of the enclosure of the mobile diesel generator 200.

The primary intake line 334 includes a first end 342 and a second end 344. The primary intake line 334 delivers DEF from the enclosure mounting portion 330 to the wye connector 336. In some examples, the first end 342 of the primary intake line 334 is connected to the mounting flange 333 of the enclosure mounting portion 330 and the second end 344 of the primary intake line 334 is connected to an intake of the wye connector 336. In some examples the primary intake line 334 is formed as a substantially linear pipe, in other examples, the primary intake line 334 includes one or more bends along the length of the primary intake line 334. In the example of FIG. 9, the primary intake line 334 includes an approximately forty-five degree bend adjacent to the first end 342 of the primary intake line 334.

The wye connector 336 includes a wye intake 348, a first tank output 350, and a second tank output 352. The wye connector 336 is configured to split the flow of DEF from the primary intake line 334 between the first tank 312 and the second tank 314. In some examples, wye connector 336 is shaped as a three way Y-fitting. The wye connector 336 is attached at the primary intake line 334 at the wye intake 348, the first tank intake line 338 at the first tank output 350, and the second tank intake line 340 at the second tank output 352. In some examples, the primary intake line 334 is fluidly connected to the first tank intake line 338 and the second tank intake line 340 by the wye connector 336. In some examples, the wye connector 336 includes one or more bends along its length. For example, in the example of FIG. 9, the wye connector 336 includes a ninety degree bend adjacent the wye intake 348.

The first tank intake line 338 includes a first end 354 and a second end 356. The first tank intake line 338 is connected to the first tank output 350 of the wye connector 336 at the first end 354 and is connected to the DEF intake port 322 of the first tank 312 at the second end 356. In some examples, like the primary intake line 334, the first tank intake line 338 is formed as a substantially linear pipe, in other examples, the first tank intake line 338 includes one or more bends along the length of the first tank intake line 338. In the example of FIG. 9, first tank intake line 338 includes a ninety degree elbow bend adjacent to the second end 356 of the first tank intake line 338.

The second tank intake line 340 includes a first end 362 and a second end 364. In some examples, the second tank intake line 340 further includes a sleeve 366. The second tank intake line 340 is connected to the second tank output 352 of the wye connector 336 at the first end 362 and is connected to the DEF intake port 322 of the second tank 314 at the second end 364. In some examples, like the first tank intake line 338, the second tank intake line 340 is formed as a substantially linear pipe, in other examples, the second tank intake line 340 includes one or more bends along the length of the second tank intake line 340. In the example of FIG. 9, second tank intake line 340 includes a ninety degree elbow bend adjacent to the second end 364 of the second tank intake line 340.

In some examples, using the intake 304 to fill the first tank 312 and the second tank 314 is beneficial because it allows for both the first tank 312 and the second tank 314 to be simultaneously filled through the DEF intake ports 322 of the first tank 312 and the second tank 314. This allows a user to more quickly fill the first tank 312 and the second tank 314, as the user need not wait for DEF to flow from one of the first tank 312 or the second tank 314 through the connection line 315, such as what might be the case when only one of the first tank 312 or the second tank 314 is filled through the DEF intake port 322.

Figure 10:
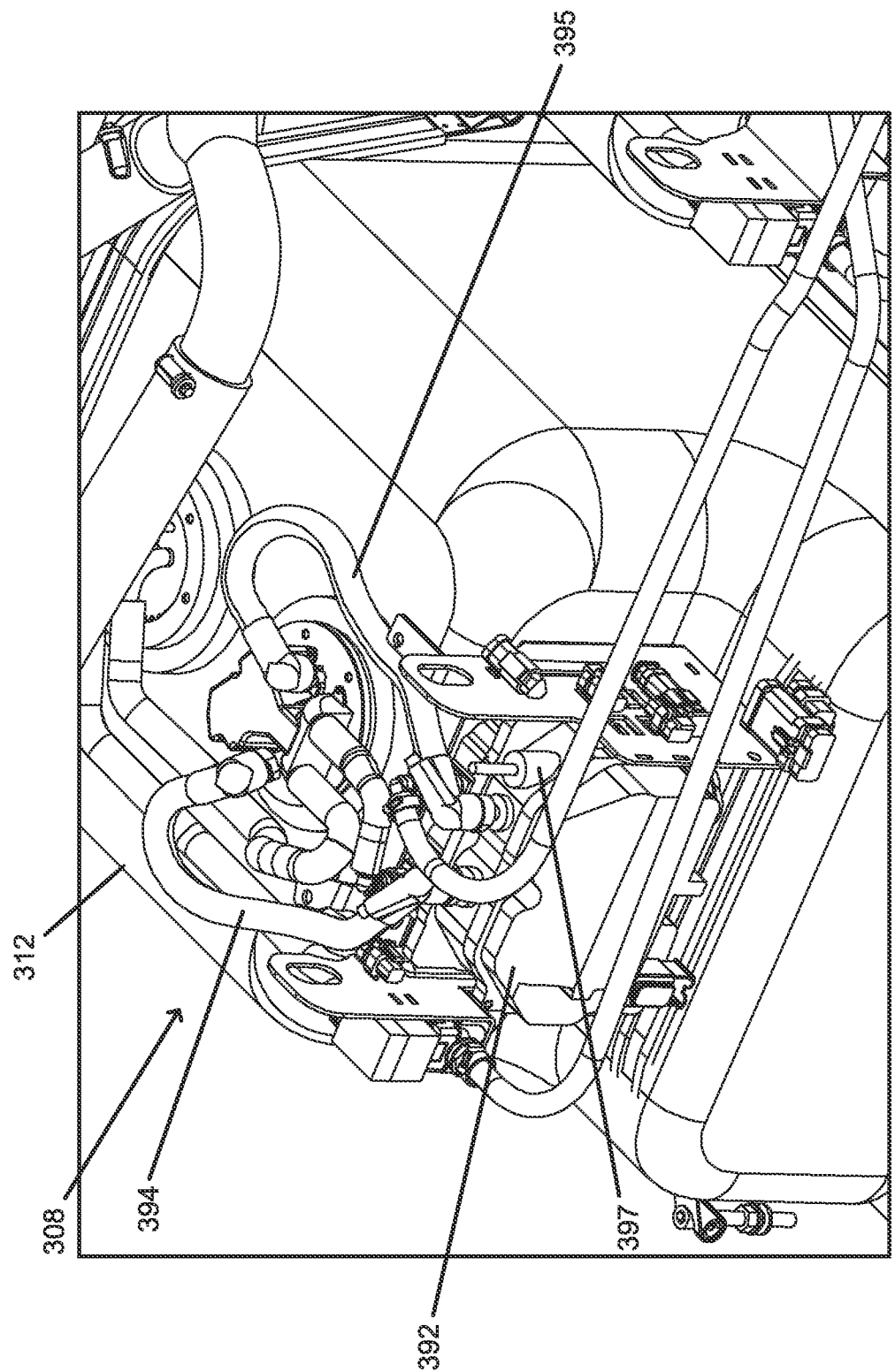
FIG. 10 is a perspective view of an example DEF pumping system of the DEF storage system of FIG. 3.

FIG. 10 is a perspective view of the DEF pumping system 308 of the DEF storage system 300. The DEF pumping system 308 includes a pump 392 (which includes a pump output 397), a pump intake line 394, and a pump output line (not pictured). In some examples, the DEF pumping system 308 further includes a first tank return line 395.

In some examples, a first end of the pump intake line 394 is inserted into an interior of the first tank 312 through the second auxiliary port 326. In some examples, the pump intake line 394 is connected to an intake of the pump 392 at second end of the pump intake line 394. In some examples, the pump 392 is mounted to the first tank 312 and is adapted to draw DEF from the first tank 312 via the pump intake line 394. In some examples, the pump 392 is further adapted to discharge DEF from the pump output 397 via the pump output line to a clean emissions module in communication with an engine. In some examples, the pump 392 comprises, for example, a diaphragm pump or a centrifugal pump.

In some examples, the pump 392 may be configured to pump DEF from various components of the DEF pumping system 308 back to the first tank 312 through the first tank return line 395.

In some examples, the DEF storage system 300 only includes one pump for pumping DEF from the reservoir portion 302 to the engine 204. In some examples, DEF is only pumped from a single tank, such as, for example, the first tank 312. However, as DEF is pumped from the first tank and the fill level of DEF within the first tank 312 decreases, DEF flows through the connection line 315 from the second tank 314 into the first tank 312 such that the DEF level in the first tank 312 equals the DEF level in the second tank 314. In some examples, the rate at which the DEF is pumped from the first tank 312 is lower than the rate at which DEF is able to flow from the second tank 314 into the first tank 312 through the connection line 315. For example, in some examples, the rate at which DEF is pumped from the first tank 312 is about one gallon per hour, and the rate at which the DEF flows from the second tank 314 into the first tank 312 through the connection line 315 is greater than about one gallon per hour.

In other examples, the DEF storage system 300 includes more than one pump for pumping DEF, such that each of the first tank 312 and the second tank 314 are equipped with a pump.

Figure 11:
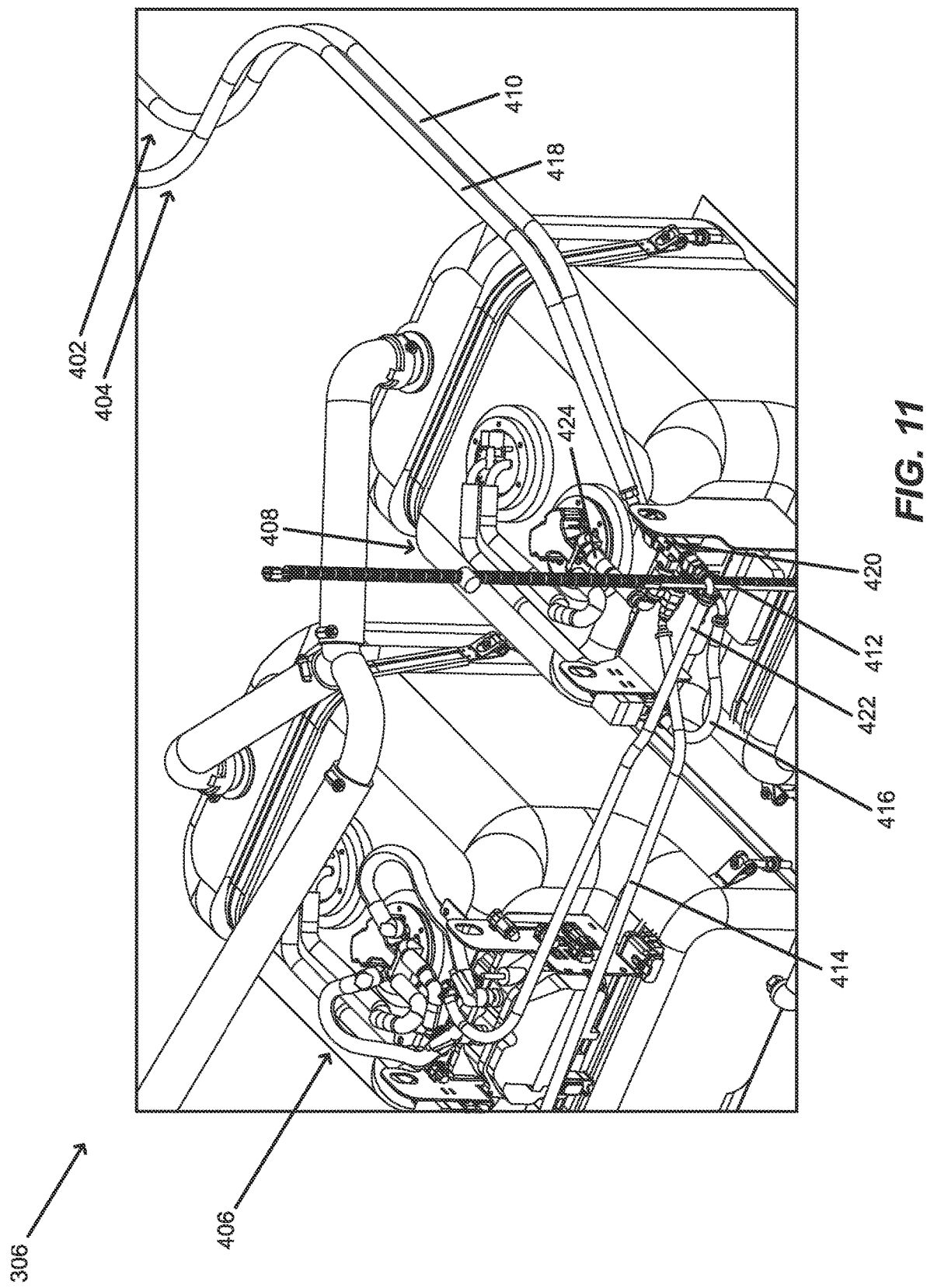
FIG. 11 is a perspective view of an example heating system of the DEF storage system of FIG. 3.

FIG. 11 is a perspective view of the heating system 306 of the DEF storage system 300. The heating system 306 includes an engine coolant supply line 402, an engine coolant return line 404, a first tank heating assembly 406, and a second tank heating assembly 408. In some examples, through the use of the heating system 306, the DEF within the first tank 312 and the second tank 314 can be kept at a temperature above the freezing point of the DEF, such that the DEF remains in a liquid state and able to be delivered to the engine even when the DEF storage system 300 is placed an environment with temperatures below the freezing point of the DEF. In some examples, the heating system 306 of the DEF storage system 300 is capable of heating the DEF in the DEF storage system 300 while the engine is running. In some examples, the heating system 306 is capable of heating the DEF in the DEF storage system 300 so as to thaw the DEF within the first tank 312 and the second tank 314 after it has frozen within the DEF storage system 300, which may be the case when the DEF storage system 300 is located in a cold environment for extended periods of time while the engine is not running.

In some examples, the heating system 306 functions by delivering engine coolant from an engine, through the engine coolant supply line 402, to the first tank heating assembly 406 and the second tank heating assembly 408, after which the engine coolant is transferred from the heating system 306 back to the engine via the engine coolant return line 404.

In some examples, the engine coolant supply line 402 includes a main supply line 410, a supply T-fitting 412, a first tank supply line 414, and a second tank supply line 416. In some examples, the main supply line 410 delivers engine coolant from the engine to the supply T-fitting 412. Once the coolant is delivered to the supply T-fitting 412, the coolant is split between the first tank supply line 414 and the second tank supply line 416 through which the engine coolant is delivered to the first tank heating assembly 406 and the second tank heating assembly 408.

In some examples, the engine coolant return line 404 includes a main return line 418, a return T-fitting 420, a first tank return line 422, and a second tank return line 424. In some examples, once the engine coolant leaves the first tank heating assembly 406 and the second tank heating assembly 408, it is fed into the first tank return line 422 and the second tank return line 424, respectively. Each of the first tank return line 422 and the second tank return line 424 are connected to and deliver engine coolant to the return T-fitting 420. The engine coolant from the first tank return line 422 and the second tank return line 424 flow through the return T-fitting into the main return line 418, through which the engine coolant flows back to the engine.

Figure 12:
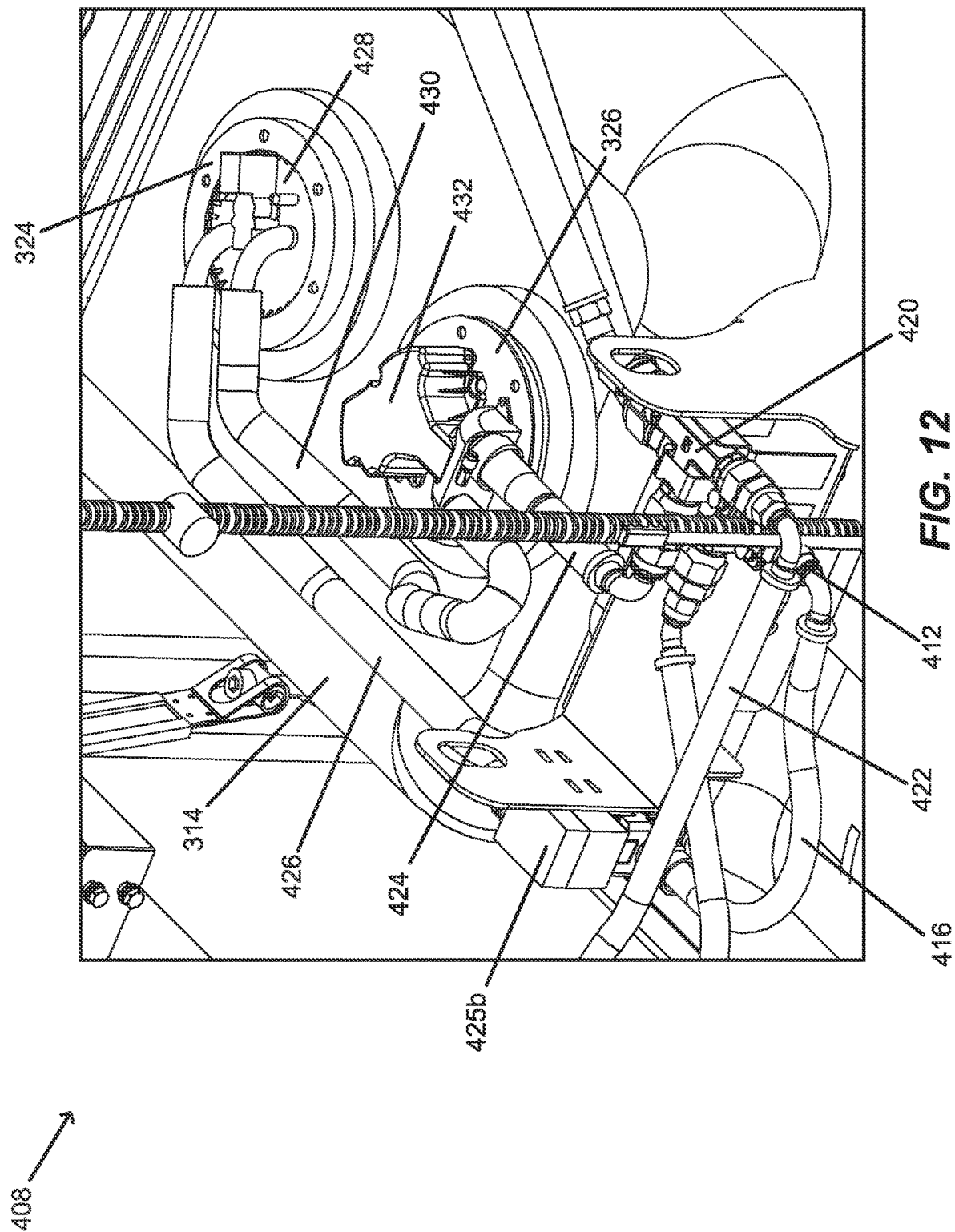
FIG. 12 is a perspective view of an example second tank heating assembly of the heating system of FIG. 11.

FIG. 12 is a detail view of the second tank heating assembly 408. In some examples, the second tank heating assembly 408 includes a diverter valve 425, a coil supply line 426, a first coil 428, a coil connection line 430, and a second coil 432. In some examples, each of the diverter valve 425, the coil supply line 426, the first coil 428, the coil connection line 430, and the second coil are fluidly connected. In some examples, the second tank supply line 416 is connected to the diverter valve 425*b*. The diverter valve 425*b* is connected to the coil supply line 426. The coil supply line 426 is connected to the first coil 428, the first coil 428 is connected to the coil connection line 430. The coil connection line 430 is connected to the second coil 432. And the second coil 432 is connected to the second tank return line 424.

In some examples, after the engine coolant is delivered to the second tank heating assembly 408 via the second tank supply line 416, the coolant reaches the diverter valve 425*b* of the second tank heating assembly 408. In some examples, the diverter valve 425 is adjustable between an open position in which the coolant is permitted to flow through the diverter valve 425b into the second tank heating assembly 408 and a closed position in which the coolant is restricted from flowing through the diverter valve 425b into the second tank heating assembly. In some examples, as explained in greater detail with reference to the embodiment of FIG. 14, the diverter valve 425b receives signals that cause the diverter valve 425b to be adjusted between the open position and closed position. When placed into the open position, coolant flows through the diverter valve 425b into the coil supply line 426. After flowing through the coil supply line 426, the coolant enters and flows through the first coil 428. After flowing through the first coil 428, the coolant flows through the coil connection line 430 and into the second coil 432 In some examples, once the coolant flows from the second coil 432, the coil flows into the second tank return line 424.

In some examples, each of the first coil 428 and the second coil 432 are mounted onto the top side 313 of the second tank 314. The first coil 428 extends through the first auxiliary port 324 into the interior of the second tank 314 and the second coil 432 extends through the second auxiliary port 326 into the interior of the second tank 314. In some examples, each of the first coil 428 and the second coil 432 are formed as a curved section of conduit comprising a material having thermal conduction characteristics, such as, for example, aluminum, aluminum alloy, brazed aluminum, copper, or copper-nickel alloy. In some examples, each of the first coil 428 and/or the second coil 432 comprise a DEF header assembly, such as, for example, one of a DEF header assembly manufactured by Perkins Engines Company Limited. In some examples, as the coolant flows through the first coil 428 and the second coil 432, heat from the coolant is transferred to the DEF inside of the second tank 314 via the thermally conductive first coil 428 and second coil 432. In some examples, greater numbers of coils may be used within the second tank 314. In other examples, a single coil may be used within the second tank 314.

Figure 13:
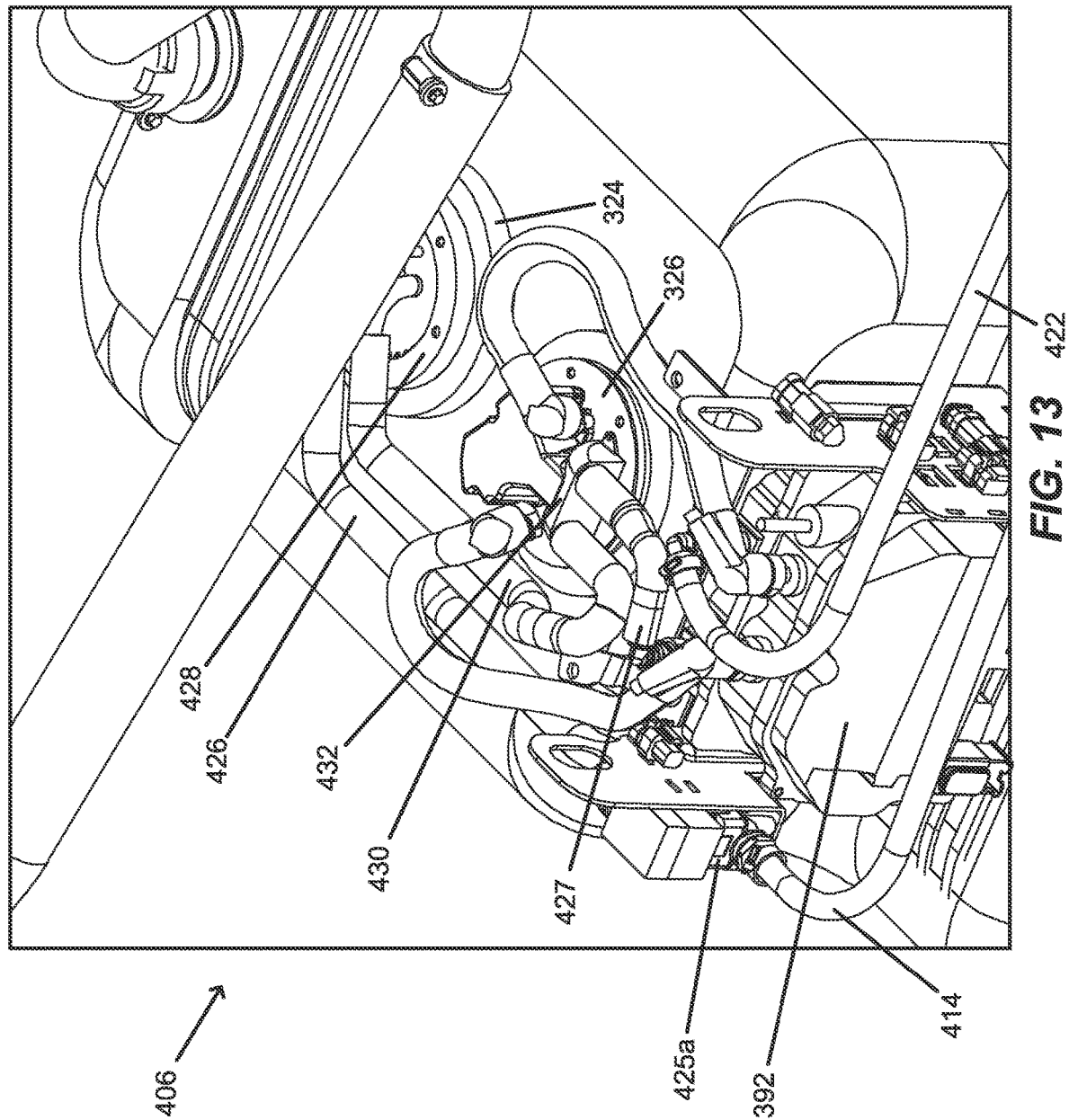
FIG. 13 is a perspective view of an example first tank heating assembly of the heating system of FIG. 11.

FIG. 13 is a detail view of the first tank heating assembly 406.

In some examples, the first tank heating assembly 406 is configured substantially similarly to the second tank heating assembly 408 such that it includes each of the same components described with reference to the second tank heating assembly 408 and functions substantially similarly to the second tank heating assembly 408. In some examples, the first tank heating assembly 406 differs from the second tank heating assembly 408 in that the first tank coolant diverter valve 425a of the first tank heating assembly 406 is connected to the first tank supply line 414, and the second coil 432 of the first tank heating assembly 406 is connected to the first tank return line 422.

In other examples, the first tank heating assembly 406 differs from the second tank heating assembly 408 in that the first tank heating assembly 406 further includes a pump heating line 427. In some examples, the pump heating line 427 is connected to the second coil 432 of the first tank heating assembly 406 at first end, and the pump 392 at a second end. In some examples, the pump heating line 427 delivers coolant from the second coil 432 to the pump 392 to regulate the temperature of the DEF in the pump 392. In some examples, the first tank return line 422 is connected to the pump 392 such that the coolant exits the pump 392 via the first tank return line 422, though which it is delivered to the return T-fitting 420.

Figure 14:
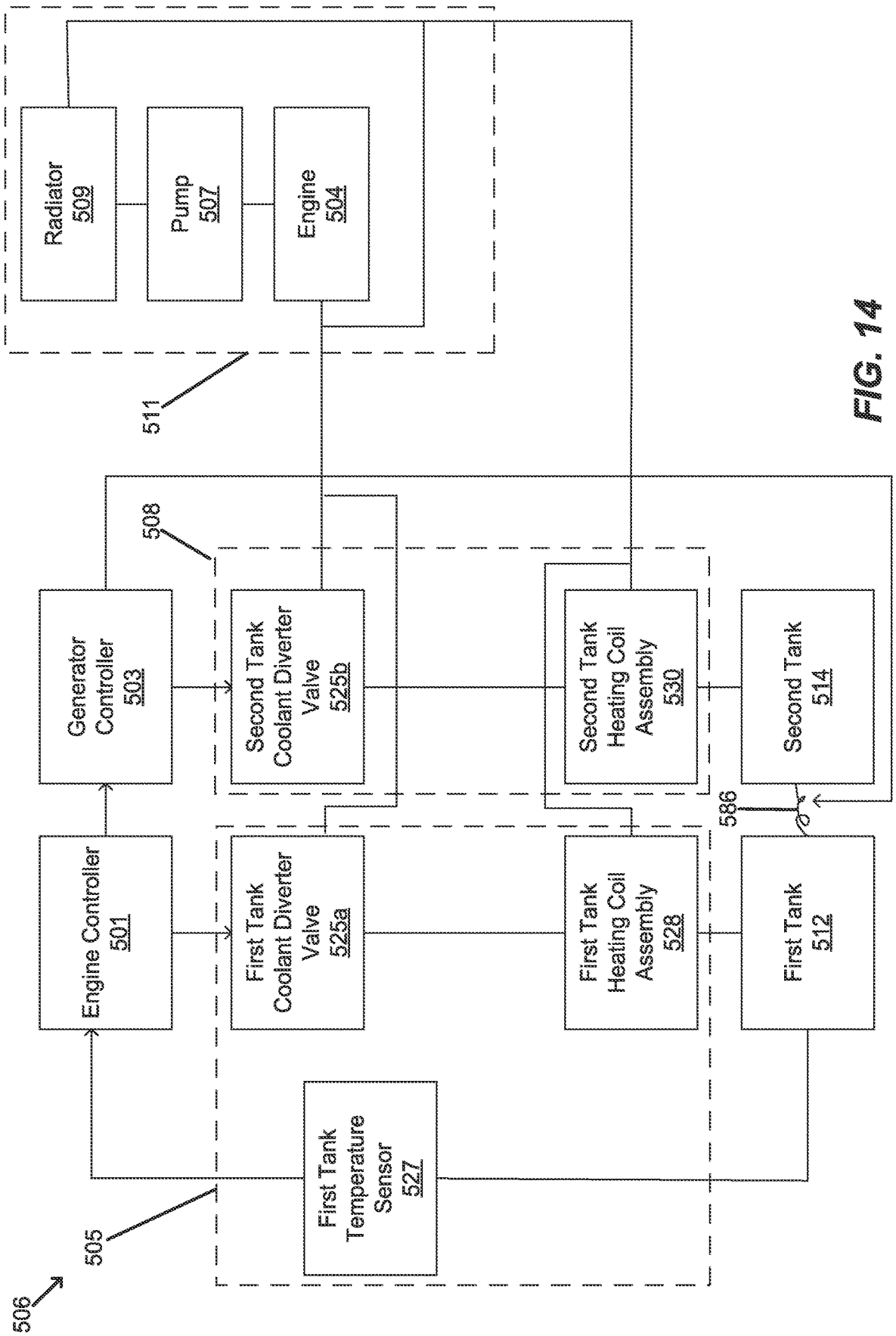
FIG. 14 is a schematic view of an example heating system of a DEF storage system.

FIG. 14 is an example schematic view of a heating system 506 for a diesel generator 500. In some examples, the heating system 506 is substantially similar to the example heating system 306. In the example of FIG. 14, the heating system 506 includes an engine controller 501, a generator controller 503, first tank heating assembly 505, a second tank heating assembly 508, an engine 504, a coolant pump 507, and a radiator 509. In some examples, the heating system 506 is configured to regulate the temperature of DEF in a first tank 512 and a second tank 514. In some example, the first tank 512 and the second tank 514 are substantially similar to the first tank 312 and the second tank 314, described with reference to FIGS. 3-13.

In some examples, the first tank heating assembly 505 is configured substantially similarly to the first tank heating assembly 406. In some examples, the first tank heating assembly 505 includes a first tank temperature sensor 527, a first tank heating coil assembly 528, and a first tank coolant diverter valve 525a. In some examples, the second tank heating assembly 508 is configured substantially similarly to the second tank heating assembly 408. In some examples, the second tank heating assembly 508 includes a second tank coolant diverter valve 525b and a second tank heating coil assembly 530. In some examples, each of the first tank heating coil assembly 528 and the second tank heating coil assembly 530 include one or more heating coils that are arranged within the first tank 512 and the second tank 514, respectively.

In some examples, the first tank temperature sensor 527 is configured to monitor the temperature of the DEF within the first tank 512. The first tank temperature sensor 527 provides signals corresponding to the measured temperature to the engine controller 501. In some examples, the measured temperature of the first tank 512 is used to infer the temperature of the second tank 514. In other examples, the second tank heating assembly 508 may also include a second tank temperature sensor configured to monitor the temperature of DEF within the second tank 514. In some examples, using the first tank temperature sensor 527 to infer the temperature of the second tank 514 is beneficial because it allows for the use of fewer sensors and components (thereby minimizing cost and complexity) while still providing an accurate estimate of the temperature of the second tank 514. In some examples, the use of the first tank temperature sensor 527 to infer the temperature of the second tank 514 may also be beneficial because it allows for the temperature of the second tank to be estimated while not having to wire another electrical connection between the engine controller 501 and a second tank temperature sensor.

The engine controller 501 is configured to monitor the signals generated by the first tank temperature sensor 537. In some examples, the engine controller is also configured to monitor the second tank temperature sensor. In some examples, if the signals generated by the first tank temperature sensor 527 indicate that the DEF temperature is lower than a lower threshold value, the engine controller 501 is configured to generate a signal to initiate heating of the DEF. In some examples if the signals generated by the second tank temperature sensor indicate that the DEF temperature is lower than a threshold value, the engine controller 501 is configured to generate a signal to initiate heating of the DEF.

In some examples, the lower threshold value is about 40 degrees Fahrenheit+/−about 9 degrees Fahrenheit (such as 40 degrees Fahrenheit+/−9 degrees Fahrenheit). In some examples, the lower threshold value is greater than about 12 degrees Fahrenheit and less than about 86 degrees Fahrenheit.

In some examples, the engine controller 501 signal to initiate heating of the DEF comprises an instruction to adjust the position of the first tank coolant diverter valve 525a into an open position. In some examples, the engine controller 501 signal to initiate heating of the DEF comprises an instruction to adjust the position of the second tank coolant diverter valve 525b into an open position.

In some examples, the generator controller 503 monitors the signals generated by the engine controller 501, such as the signal to initiate heating of the DEF. In such examples, when the generator controller 503 detects that the engine controller 501 has transmitted a signal to initiate heating of the DEF, the generator controller 503 transmits a corresponding signal to initiate heating of the DEF. In some examples, the signal to initiate heating of the DEF initiated by the generator controller 503 comprises an instruction to adjust the position of the second tank coolant diverter valve 525b into an open position. In some examples, using the generator controller 503 to monitor signals produced by the engine controller 501 and generate corresponding signals to open the second tank coolant diverter valve 525b is beneficial because it allows for the second tank coolant diverter valve 525b to be adjusted without having to electrically connect the second tank coolant diverter valve 525b directly to the engine controller 501.

In some examples, diesel generator 500 includes an engine cooling circuit 511 comprising a coolant pathway through the radiator 509, coolant pump 507, and engine 504 of the diesel generator 500. In some examples, in the engine cooling circuit 511, coolant is pumped by the coolant pump 507 and is routed through the engine 504. As the coolant passes through the engine 504 it operates as a heat sink to cool the engine 504. This results in the temperature of the coolant increasing. In some examples, after the coolant passes through and is heated by the engine, it is routed to the radiator 509. As the coolant passes through the radiator 509 it is cooled back down before it is ultimately routed back to the coolant pump 507.

In some examples, when the first tank coolant diverter valve 525a and the second tank coolant diverter valve 525b are placed in a closed position, the coolant is routed continuously through the engine cooling circuit 511. In other examples, when the first tank coolant diverter valve 525a and the second tank coolant diverter valve 525b are placed into an open position, coolant flows from the engine cooling circuit 511, through the first tank heating assembly 505 and the second tank heating assembly 508 to increase the temperature of the DEF in the first tank 512 and the second tank 514, after which it flows back into the engine cooling circuit 511. Specifically, in some examples, when the first tank coolant diverter valve 525a and the second tank coolant diverter valve 525b are placed into an open position, coolant that is heated by the engine is pumped from the engine cooling circuit 511 to the first tank coolant diverter valve 525a and the second tank coolant diverter valve 525b. The coolant flows from the first tank coolant diverter valve 525a and the second tank coolant diverter valve 525b to the first tank heating coil assembly 528 and the second tank heating coil assembly 530, respectively. Once in the first tank heating coil assembly 528 and the second tank heating coil assembly 530, the coolant heats the DEF in the first tank 512 and the second tank 514, respectively. The coolant then flows from the first tank heating coil assembly 528 and the second tank heating coil assembly 530 back to the engine cooling circuit 511. In some examples, the coolant pump 507 drives the flow of coolant from the engine cooling circuit 511 through the remainder of the heating system 506.

In some examples, the first tank temperature sensor 527 is configured to continuously monitor the temperature of the DEF within the first tank 512 while the coolant is pumped through the first tank heating coil assembly 528. In some examples, a second tank temperature sensor is configured to monitor the temperature of DEF within the second tank 514.

In some examples, the engine controller 501 is configured to monitor the signals generated by the first tank temperature sensor 537. In some examples, the engine controller is also configured to monitor the second tank temperature sensor. In some examples, if the signals generated by the first tank temperature sensor 527 indicate that the DEF temperature is greater than an upper threshold value, the engine controller 501 is configured to generate a signal to stop heating of the DEF. In some examples if the signals generated by the second tank temperature sensor indicate that the DEF temperature is greater than an upper threshold value, the engine controller 501 is configured to generate a signal to stop heating of the DEF.

In some examples, the upper threshold value is about 60 degrees Fahrenheit+/−about 5 degrees Fahrenheit (such as 60 degrees Fahrenheit+/−5 degrees Fahrenheit). In some examples the upper threshold value is greater than about 12 degrees Fahrenheit and less than about 86 degrees Fahrenheit.

In some examples, the engine controller 501 signal to stop heating of the DEF comprises an instruction to adjust the position of the first tank coolant diverter valve 525a into a closed position. In some examples, the engine controller 501 signal to stop heating of the DEF comprises an instruction to adjust the position of the second tank coolant diverter valve 525b into a closed position.

In some examples, the generator controller 503 monitors the signals generated by the engine controller 501, such as the signal to stop heating of the DEF. In such examples, when the generator controller 503 detects that the engine controller 501 has transmitted a signal to stop heating of the DEF, the generator controller 503 transmits a corresponding signal to stop heating of the DEF. In some examples, the signal to stop heating of the DEF initiated by the generator controller 503 comprises an instruction to adjust the position of the second tank coolant diverter valve 525b into a closed position.

In some examples, once the first tank coolant diverter valve 525a and the second tank coolant diverter valve 525b are placed into a closed position, coolant is routed through the engine cooling circuit 511 and is shut off from entering the first tank heating assembly 505 or the second tank heating assembly 508.

In some examples, the engine controller 501 operates to control the first tank coolant diverter valve 525a and the generator controller 503 reads temperature data from the engine controller 501. In some examples, the generator controller 503 reads temperature data from the engine controller 501 via CAN communication. In some examples, based on the value of the temperature data, the generator controller 503 operates to control the second tank coolant diverter valve 525b.

In some examples, a heating coil 586 for a connection line between the first tank 512 and the second tank 514 is also included within the heating system 506. In some examples, the heating coil 586 is substantially similar to the heating coil 386, described above with reference to FIG. 7.

In other examples, unlike the heating coil 386, described with reference to FIG. 7 above, the heating coil 586 is electrically connected to one or more of the engine controller 501 or the generator controller 503. In some examples, the electrical connection is provided by an electrical harness, such as the electrical harness 374, described above with reference to FIG. 7.

In some examples, the engine controller 501 or the generator controller 503 transmits an electrical signal to a switch within the electrical harness, which causes power to be delivered to the heating coil 586. In some examples, the electrical signal is generated when the temperature of a DEF temperature sensor, such as the first tank temperature sensor 527 senses that the temperature of the DEF is below a lower threshold value.

In some examples, the engine controller 501 or the generator controller 503 transmits an electrical signal to the switch, which causes the power to stop being delivered to the heating coil 586. In some examples, the electrical signal is generated when the temperature of a DEF temperature sensor, such as the first tank temperature sensor 527 senses that the temperature of the DEF is above an upper threshold value.

In some examples, the lower threshold value is about 40 degrees Fahrenheit+/−about 9 degrees Fahrenheit (such as 40 degrees Fahrenheit+/−9 degrees Fahrenheit). In some examples, the upper threshold value is about 60 degrees Fahrenheit+/−about 5 degrees Fahrenheit (such as 60 degrees Fahrenheit+/−5 degrees Fahrenheit). In some examples each of the upper threshold and the lower threshold values are greater than about 12 degrees Fahrenheit and less than about 86 degrees Fahrenheit.

In some examples, use of the concepts presented in the present disclosure allows for the amount of DEF carried onboard and within an emissions control system, such as an emissions control system that includes the DEF storage system 300, to be increased by using two on-board DEF tanks instead of a single on-board DEF tank. This allows for the diesel emissions control system to be run for a longer amount of time without requiring an operator to refill an onboard DEF tank. In some examples, greater numbers of on-board DEF tanks can be added to the DEF storage system using the concepts presented herein, such as, for example, three, four, five, or more DEF tanks. In some examples, the concepts of the present disclosure may be utilized to convert DEF storage system using a single on-board DEF tank to include greater numbers of on-board DEF tanks.

In some examples, using the DEF storage system 300 with the first tank 312 and the second tank 314 within a diesel generator, such as the mobile diesel generator 200 permits the generator to operate for at least twenty-four hours before the reservoir portion 302 needs to be refilled.

This disclosure should be understood to include (as illustrative and not limiting) the subject matter set forth in the following numbered clauses:

Clause 1: A generator comprising:
a diesel emissions control system, the diesel emissions control system comprising:
an onboard reservoir, the onboard reservoir comprising a first DEF tank and a second DEF tank, the first DEF tank being fluidly connected to the second DEF tank by a connection line;
an intake being fluidly connected to the first DEF tank by a first tank intake line and the second DEF tank by a second tank intake line;
a pump fluidly connected to at least one of the first DEF tank and the second DEF tank; and
a heating system comprising an engine coolant supply line, an engine coolant return line, a first tank heating assembly, and a second tank heating assembly.

Clause 2: The generator of clause 1, wherein each of the first tank heating assembly and the second tank heating assembly include a heating coil.

Clause 3: The generator of any one of clauses 1-2, wherein the diesel emissions control system further comprises an engine and a coolant pump for pumping engine coolant from the engine through the engine coolant supply line, the first tank heating assembly, the second tank heating assembly, and the engine coolant return line.

Clause 4: The generator of any one of clauses 1-3, wherein the generator is configured to operate for at least twenty-four hours before the onboard reservoir is resupplied with DEF.

Clause 5. The generator of any one of clauses 1-4, wherein the intake further comprises a primary intake line, the primary intake line being fluidly connected to the first tank intake line and the second tank intake line.

Clause 6: The generator of any one of clauses 1-5, wherein the intake further comprises a single fill port through which DEF is provided to the first DEF tank and the second DEF tank.

Clause 7: The generator of any one of clauses 1-6, wherein the connection line further comprises a drain, wherein the drain allows for DEF to be drained from the first DEF tank and the second DEF tank.

Clause 8: The generator of any one of clauses 1-7, wherein the connection line comprises a conduit portion and a heating portion, the heating portion comprising a thermal switch configured to control the delivery of electrical power to a heating coil and an insulation portion that surrounds the heating coil.

Clause 9: The generator clause 8, wherein the thermal switch provides electrical power to the heating coil when the thermal switch detects that the temperature of an environment in which the generator is arranged is below a temperature threshold.

Clause 10: The generator of any one of clauses 1-9, wherein the diesel emissions control system further comprises:
an engine controller; and
a temperature sensor configured to measure the temperature of DEF in at least one of the first DEF tank and the second DEF tank, the temperature sensor being further configured to provide a first signal corresponding to the measured temperature to the engine controller;
wherein the engine controller is configured to generate a second signal to initiate heating when the first signal indicates that the temperature of the DEF is lower than a threshold value.

Clause 11: The generator of clause 10, wherein the diesel emissions control system further comprises:
a generator controller; wherein the generator controller is configured to detect that the engine controller has generated the second signal, and wherein the generator controller is further configured to generate a third signal to initiate heating in response to detecting that the engine controller has generated the second signal;
wherein the second signal causes engine coolant to be delivered to the first tank heating assembly; and
wherein the third signal causes engine coolant to be delivered to the second tank heating assembly.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A diesel emissions control system comprising:
   a reservoir comprising a first DEF tank and a second DEF tank, the first DEF tank and the second DEF tank being fluidly connected;
   an intake connected to each of the first DEF tank and the second DEF tank, the intake comprising a single fill port;
   a pump fluidly connected to at least one of the first DEF tank and the second DEF tank, the pump being configured to pump DEF from the at least one of the first DEF tank and the second DEF tank;
   a heating system comprising:
      a first tank heating coil assembly;
      a second tank heating coil assembly; and
      an engine coolant supply line configured to deliver coolant to the first DEF tank and the second DEF tank from an engine cooling circuit:
   an engine controller, the engine controller being configured to control the delivery of coolant to the first DEF tank; and
   a generator controller, the generator controller being configured to control the delivery of coolant to the second DEF tank;
   wherein controlling the delivery of coolant to the first DEF tank comprises selectively adjusting a position of a first tank coolant diverter valve in fluid communication with the engine coolant supply line, and wherein controlling the delivery of coolant to the second DEF tank comprises selectively adjusting a position of a second tank coolant diverter valve in fluid communication with the engine coolant supply line.

2. The diesel emissions control system of claim 1, wherein the first DEF tank and the second DEF tank are fluidly connected by a connection line, the connection line comprising a conduit portion and a heating portion.

3. The diesel emissions control system of claim 2, wherein the heating portion comprises a thermal switch configured to control the delivery of electrical power to a heating coil.

4. The diesel emissions control system of claim 3, wherein the connection line further comprises a drain.

5. A DEF storage system comprising:
   a reservoir comprising a first DEF tank and a second DEF tank, the first DEF tank being fluidly connected to the second DEF tank by a connection line, the connection line providing for equalization of a level of DEF in the first DEF tank and the second DEF tank;
   an intake connected to at least one of the first DEF tank;
   a pump connected to at least one of the first DEF tank and the second DEF tank, the pump being configured to pump DEF from both the first DEF tank and the second DEF tank; and
   a heating system for heating DEF in the reservoir, the heating system comprising:
      an engine coolant supply line that supplies engine coolant to each of the first DEF tank and the second DEF tank;
      a first coolant diverter valve; and
      a second coolant diverter valve, each of the first coolant diverter valve and the second coolant diverter valve being selectively adjustable between an open position and a closed position, wherein when placed into the open position, the first coolant diverter valve permits the flow of coolant from the engine coolant supply line to the first DEF tank and the second coolant diverter valve permits the flow of coolant from the engine coolant supply line to the second DEF tank.

6. The DEF storage system of claim 5, wherein the connection line includes a drain.

7. The DEF storage system of claim 5, wherein the connection line is a heated connection line.

8. The DEF storage system of claim 5, wherein the intake comprises a first tank intake line fluidly connected to the first DEF tank.

9. The DEF storage system of claim 8, wherein the intake further comprises a second tank intake line fluidly connected to the second DEF tank.

10. The DEF storage system of claim 9, wherein the intake further comprises a primary intake fluidly connected to each of the first tank intake line and the second tank intake line.

11. The DEF storage system of claim 5, wherein the engine coolant supply line comprises a main supply line, a supply T-fitting, a first tank supply line, and a second tank supply line, wherein each of the main supply line, the first tank supply line, and the second tank supply line are connected to the supply T-fitting, wherein the first tank supply line is further connected to the first coolant diverter valve, and wherein the second tank supply line is further connected to the second coolant diverter valve.

12. A mobile diesel generator comprising the DEF storage system of claim 5.

* * * * *